(12) United States Patent
Gagliano

(10) Patent No.: US 8,260,496 B2
(45) Date of Patent: Sep. 4, 2012

(54) ADAPTIVE ACTIVE SUSPENSION AND AWARE VEHICLE NETWORK SYSTEM AND METHOD

(75) Inventor: Charles J. Gagliano, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 589 days.

(21) Appl. No.: 12/487,140

(22) Filed: Jun. 18, 2009

(65) Prior Publication Data

US 2010/0324781 A1   Dec. 23, 2010

(51) Int. Cl.
*G06F 19/00* (2006.01)
(52) U.S. Cl. ............................................ 701/39
(58) Field of Classification Search .............. 701/37–39; 280/5.5, 5.501
See application file for complete search history.

(56) References Cited

U.S. PATENT DOCUMENTS

| | | | |
|---|---|---|---|
| 5,432,700 A | 7/1995 | Hrovat et al. | |
| 6,199,001 B1 | 3/2001 | Ohta et al. | |
| 6,574,547 B2 * | 6/2003 | MacPhail et al. | 701/117 |
| 2005/0065711 A1 * | 3/2005 | Dahlgren et al. | 701/117 |
| 2005/0077692 A1 | 4/2005 | Ogawa | |
| 2008/0183353 A1 | 7/2008 | Post et al. | |

FOREIGN PATENT DOCUMENTS

| | | |
|---|---|---|
| EP | 1857325 | 11/2007 |
| JP | 05-345509 | 12/1993 |
| JP | 2000-322695 | 11/2000 |
| WO | WO 2008/063225 | 5/2008 |

* cited by examiner

*Primary Examiner* — Yonel Beaulieu
(74) *Attorney, Agent, or Firm* — Rankin Hill & Clark LLP

(57) ABSTRACT

An aware vehicle network system and method for one or more vehicles each having adaptive active suspensions includes at least one vehicle having a vehicle position detector for determining a vehicle position and a road condition detector for determining road condition information for any given position determined by the vehicle position detector. A transmitter sends the road condition information and the vehicle position over a vehicle communication network. A central network device receives the road condition information and the vehicle position and calculates ideal active suspension parameters based thereon. The network device sends ideal active suspension parameters over the vehicle communication network to at least another vehicle having an adaptive active suspension. The adaptive active suspension is adjusted based on the ideal suspension parameters received from the network device.

21 Claims, 3 Drawing Sheets

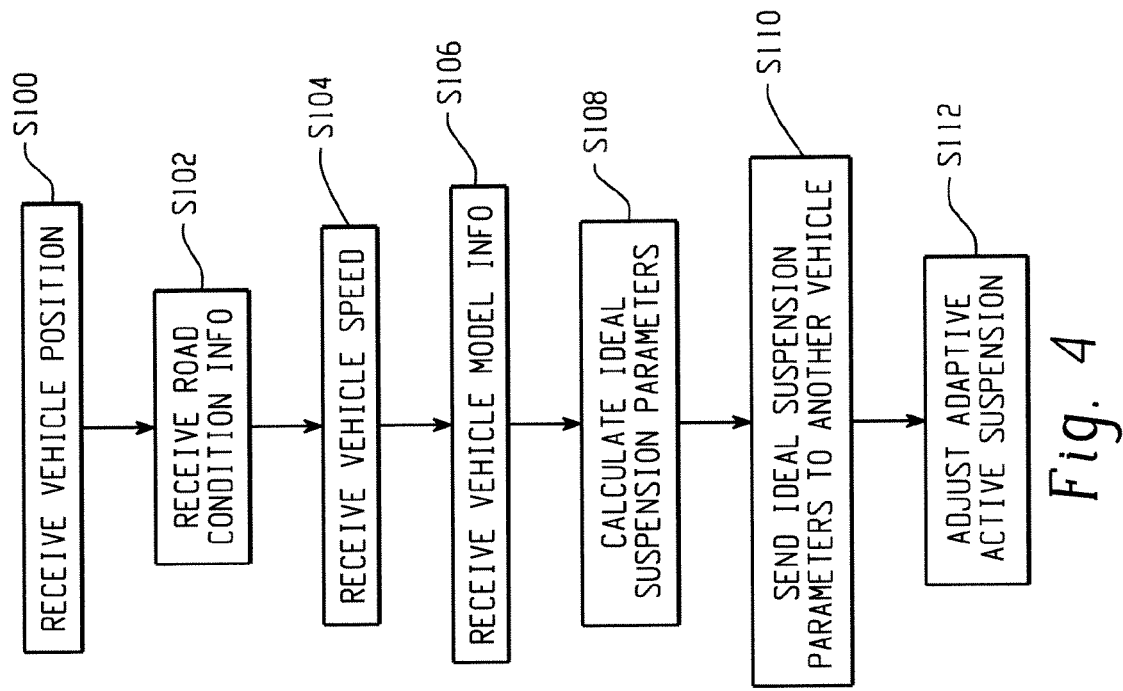
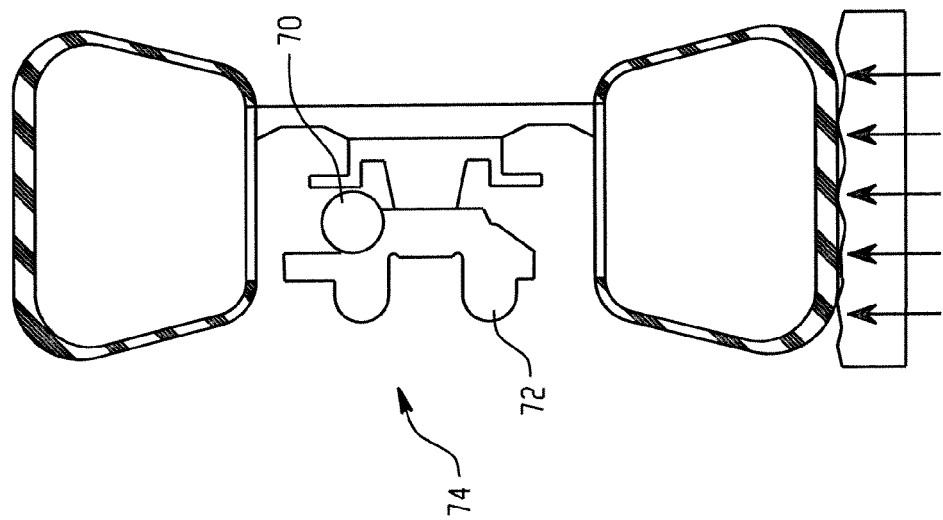

ADAPTIVE ACTIVE SUSPENSION AND AWARE VEHICLE NETWORK SYSTEM AND METHOD

BACKGROUND

The present disclosure generally relates to an adaptive active suspension and aware vehicle network system and method, and more particularly relates to a system and method enabling real-time streaming of active suspension performance parameters to any aware vehicle in an aware vehicle network.

There are many vehicles currently in the market that employ an active suspension system. Most of these existing systems are configured by the vehicle manufacturer to sense the conditions of a road being driven on via onboard sensors and reactively change suspension characteristics to improve the comfort level or driving dynamics of the vehicle. For example, the 2009 Acura MDX applies an active damper system, which has a comfort setting and a sport setting.

Even though active systems can offer significant improvement over vehicles with conventional non-active suspension systems, the active suspension vehicles must sense present driving conditions and react. As a result, the customer driving such a vehicle might unexpectedly and/or undesirably experience a change in the handling performance of a vehicle as the system reacts to a new input. Also, some vehicles offer different settings (e.g., comfort, sport, etc.), but require the customer to choose the setting in advance. Accordingly, if the customer selects the sport setting and then hits a bump unexpectedly, he or she may experience a large vibration; conversely, if the customer selects the comfort setting and then has to abruptly maneuver around the obstacle, the vehicle may not respond as well as if it were in the sport mode prior to encountering the obstacle.

SUMMARY

According to one aspect, an aware vehicle network system for one or more vehicles each having an adaptive active suspension is provided. More particularly, in accordance with this aspect, the aware vehicle network system includes at least one vehicle having a vehicle position detector for determining a vehicle position of the at least one vehicle and a road condition detector for determining road condition information for any given position determined by the vehicle position detector. The at least one vehicle also has a transmitter for sending the road condition information determined by the road condition detector and the vehicle position determined by the vehicle position detector over a vehicle communication network. A network device has a transceiver for receiving the road condition information and the vehicle position from the transmitter of the at least one vehicle over the vehicle communication network. The network device calculates ideal active suspension parameters based on the road condition information and the vehicle position received from the at least one vehicle. The network device sends the ideal active suspension parameters over the vehicle communication network via the transceiver. At least another vehicle has an adaptive active suspension and a receiver for receiving the ideal suspension parameters from the network device. The adaptive active suspension is adjusted based on the ideal suspension parameters received from the network device.

Optionally, the at least one vehicle includes a vehicle speed detector for monitoring a vehicle speed of the at least one vehicle. In this case, the transmitter sends the vehicle speed determined by the vehicle speed detector over the vehicle communication network and the transceiver of the network device receives the vehicle speed from the transmitter over the vehicle communication network. When the vehicle speed is received by the network device, the network device calculates the ideal suspension parameters based on the road condition information, the vehicle position and the vehicle speed.

Also optionally, the transmitter can send vehicle model information corresponding to the at least one vehicle over the vehicle communication network. In this case, the transceiver of the network device receives the vehicle model information from the transmitter over the vehicle communication network. When vehicle model information is received, the network device calculates the ideal active suspension parameters based on at least the road condition information, the vehicle position and the vehicle model information. By way of example, the vehicle model information can include vehicle assembly information and vehicle tire model information.

According to another aspect, an aware vehicle network method is provided for one or more vehicles having an adaptive active suspension. More particularly, in accordance with this aspect, vehicle position and road condition information are received from at least a first vehicle. Ideal suspension parameters are calculated from the vehicle position and road condition information. The ideal suspension parameters are sent to at least a second vehicle. An adaptive active suspension on the at least a second vehicle is adjusted corresponding to the ideal suspension parameters.

Optionally, vehicle speed and/or vehicle model information can be received from the at least a first vehicle. When received, the ideal suspension parameters can be calculated from the vehicle position, the road condition information and the vehicle speed and/or the vehicle model information.

According to still another aspect, an aware vehicle is provided having an adaptive active suspension. More particularly, and in accordance with this aspect, the aware vehicle includes a vehicle body having a receiver mounted thereon for continuously receiving ideal active suspension parameters from a network device over a communication network. A controller is onboard the vehicle body and linked to the receiver for receiving the ideal suspension parameters from the receiver and processing the ideal suspension parameters. The controller adjusts the adaptive active suspension based on the ideal suspension parameters. The ideal suspension parameters are calculated by the network device based on road condition information and vehicle position information transmitted to the network device from a plurality of aware vehicles over the communication network.

BRIEF DESCRIPTION OF THE DRAWINGS

FIG. 3 is a schematic illustration of a vehicle wheel assembly showing a G sensor mounted on a knuckle of the wheel assembly.

FIG. 4 is a block diagram illustrating an aware vehicle network method for vehicles having adaptive active suspensions.

DETAILED DESCRIPTION

Figure 1:
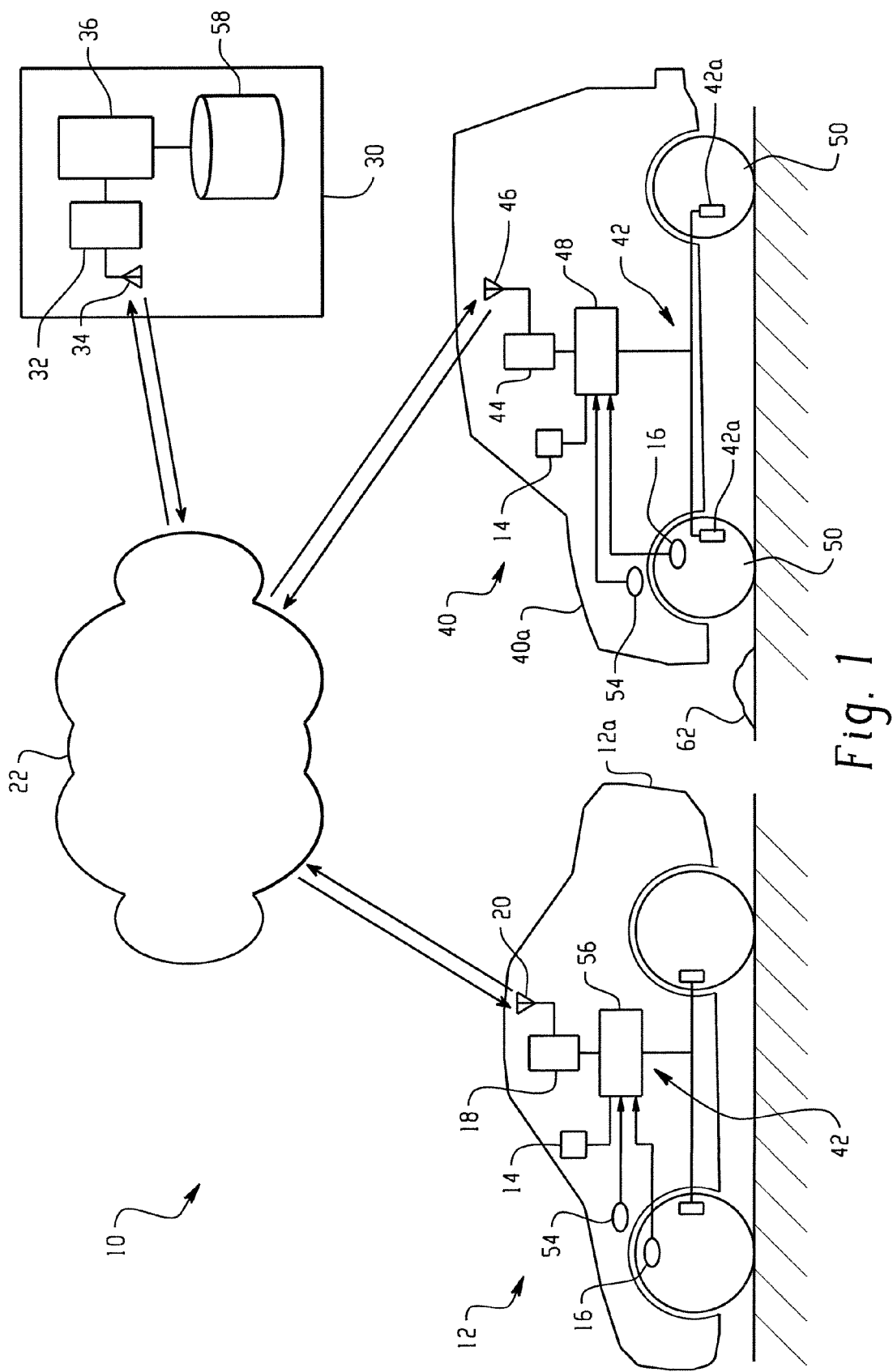
FIG. 1 is a schematic diagram illustrating an aware vehicle network system for vehicles having adaptive active suspensions.

Referring now to the drawings, wherein the showings are only for purposes of illustrating one or more exemplary embodiments and not for limiting the same, FIG. 1 shows an aware vehicle network system 10 for one or more vehicles, such as schematically depicted vehicles 12, 40 each having an adaptive active suspension. The system 10 includes at least one vehicle (e.g., first vehicle 12) having a vehicle position detector 14 for determining a vehicle position of the at least one vehicle and a road condition detector 16 for determining road condition information for any given position determined by the vehicle position detector 14. The at least one vehicle 12 also has a transmitter 18, which can include one or more antennas 20, for sending the road condition information determined by the road condition detector 16 and the vehicle position determined by the vehicle position detector 14 over a vehicle communication network 22. In particular, the vehicle position detector 14, the road condition detector 16, and the transmitter 18 can be mounted on a vehicle body 12a of the vehicle 12. In one embodiment, the vehicle communication network 22 utilizes standard 3G wireless telecommunications protocols, such as CDMA2000 1x EB-DO, GPRS, W-CDMA, or some other protocol.

The system 10 can include a network device 30 linked to or included within the vehicle communication network 22. The network device 30 can have a transceiver 32 with one or more antennas 34 for communicating over the network 22. For example, the network device 30 can receive road condition information and vehicle position from the transmitter 18 of the vehicle 12 over the communication network 22. The network device 30 can additionally include a controller or processor 36 linked to the transceiver 32. As used herein, a link or being linked is used broadly to cover any operative connection between elements of the system 10, or between components of a particular element of the system 10 (e.g., within the network device 30), whether wired or wireless that enables linked elements or components to communicate (e.g., to transmit and/or receive signals). For example, linked elements or components can use communication standards as Bluetooth™ (IEEE 802.15.1 standard compatible), other IEEE 802 standards, standard wire interfaces such as RS-232, RS-422, DIN, USB, etc.

As will be described in more detail below, the controller 36 can calculate ideal active suspension parameters for vehicles of the system 10 based on the road condition information and vehicle position received or collected from vehicles of the system, such as vehicle 12 and other aware vehicles configured to provide the network device 30 with appropriate information. These calculated ideal active suspension parameters can then be sent by the network device 30 over the vehicle communication network 22 via the transceiver 32. In particular, the system 10 includes at least another vehicle (e.g., second vehicle 40) that has an adaptive active suspension or suspension system 42 and a receiver 44 with one or more antennas 46 for receiving the ideal suspension parameters from the network device 30. Such a vehicle can be referred to as an aware vehicle. In particular, the aware vehicle 40 includes a vehicle body 40a having the receiver 44 mounted thereon for continuously receiving ideal active suspension parameters from the network device 30 over the network 22.

The vehicle 40 can further include a controller (e.g., ECU) 48 onboard the vehicle 40, particularly the body 40a, and linked to the receiver 44 for receiving the ideal suspension parameters from the receiver 44 and processing the ideal suspension parameters. The controller is configured to adjustably control the adaptive active suspension 42 based on the ideal suspension parameters (i.e., via processing of the parameters). Accordingly, the adaptive active suspension 42 can be adjusted by the controller 48 based on the ideal suspension parameters received from the network device 30 over the communication network 22. In one embodiment, the adaptive active suspension 42 can include active dampers 42a provided in association with each wheel or wheel assembly 50 of the aware vehicle 40 that are adjustably controlled by the controller 48 based on the received ideal suspension parameters. The adaptive active suspension 42 can additionally and/or alternatively include one or more of the following: active air-springs or system or a system therefor, active stabilizer bars, active steering, anti-lock brakes or a system therefor, an active torque distribution or torque vectoring system, etc.

Adjustment of the adaptive active suspension 42 on the vehicle 40 based on the ideal suspension parameters can include adjustment of the suspension 42 immediately in advance of particular road conditions, such as bumps or potholes (e.g., bump 62). For example, when a vehicle 12 (or other vehicles similarly equipped to detect road condition information at specific locations and transmit same to the network device 30) encounters a road condition, such as bump 62, the lateral movement of the vehicle 12 as measured by the road condition detector or sensor 16 (or a plurality of such sensors) and the location where such lateral movement occurs can be transmitted to the network device 30. Optionally, the vehicle speed and vehicle model information can be transmitted. Of course, the vehicle speed and model information may have a direct correlation to the amount of lateral movement measured by the detector 16 (e.g., a fast moving vehicle and/or a luxury vehicle configured for a comfortable ride may experience a smaller displacement over a bump). The network device 30 can then provide other vehicles approaching the same road condition ideal seal suspension parameters in advance of the road condition so the receiving vehicle can adjust its suspension in anticipation of the road condition.

When many vehicles are included in the system 10, based on the information transmitted by the vehicles of the system 10 concerning road condition information at specific locations as determined by the vehicle position detectors, ideal suspension parameters can be determined independently for multiple vehicles as they respectively approach these varying road conditions. This information can be further refined by adjusting based on vehicle speed that various other vehicles of the system 10 encountered the same road conditions and/or the vehicle model information for such vehicles. In one embodiment, the adaptive active suspension 42 can be a controllable suspension system including zones that are individually controllable (e.g., spring rates, damper rates, etc.). For example, the adaptive active suspension 42 can include one or more of the performance enhancement systems described in commonly owned U.S. Publication No. 2008/0183353, expressly incorporated herein by reference.

In addition to the vehicle position detector 14 and the road condition detector 16, the vehicle 12 can further include a vehicle speed detector 54 mounted on the vehicle body 12a for monitoring a vehicle speed of the vehicle 12. A controller 56 can be provided onboard the vehicle 12 and linked to the position detector 14, the road condition detector 16, the transmitter 18, and the vehicle speed detector 54. Accordingly, signals representative of the vehicle position, road condition information, and vehicle speed can be sent to the controller 56 which, via the transmitter 18, can send same to the network device 30 over the network 22. As will be described in more detail below, the transceiver 32 of the network device 30 can receive the vehicle speed sent from the transmitter 18 over the network 22 along with the vehicle position and road condition information and then can calculate the ideal active suspension parameters based on the road condition information, vehicle position and vehicle speed received from the vehicle 12.

In addition, the transmitter 18 can send vehicle model information corresponding to the vehicle 12 over the communication network 22 to the network device 30. The vehicle model information can include, for example, vehicle assembly information (e.g., information corresponding to the particular vehicle or model), vehicle tire model information (e.g., information particular to the tires on the vehicle 12), etc. Such vehicle model information can be stored in a memory of the controller 56, if desired. The transceiver 32 of the network device 30 can receive the transmitted vehicle model information from the transmitter 18 over the vehicle communication network 22. When so received, the network device 30 can calculate the ideal suspension parameters based on the road condition information, vehicle position, vehicle speed (if provided), and/or vehicle model information.

In one embodiment, the vehicle position detector 14 is a global positioning satellite (GPS) system including a GPS device mounted onboard the vehicle 12. In this embodiment, the GPS system determines the vehicle position of the vehicle 12 in a conventional manner. The GPS system could be factory supplied or an after-market system added to the vehicle, but capable of communicating with the vehicle, and particularly the controller 56, such as through a USB port or other communication link or port. In this or a separate embodiment, the road condition detector 16 can be one or more G sensors provided on the vehicle 12. For example, with reference to FIG. 3, a G sensor 70 can be disposed on a suspension knuckle 72 of a vehicle wheel assembly 74. Of course, as will be appreciated and understood by those skilled in the art, any number of G sensors 70 can be provided on the vehicle 12, including on one or more of the suspension knuckles of the vehicle or at other locations on the vehicle.

It will also be understood and appreciated by those skilled in the art that the at least one vehicle represented in the illustrated embodiment by vehicle 12 can include many similarly equipped vehicles, each having a vehicle position detector 14, a road condition detector 16, a transmitter 18, optionally a vehicle speed detector 54, and optionally capabilities for storing vehicle model information. All such vehicles, including vehicle 12, can transmit information, such as vehicle position, road condition information, vehicle speed, vehicle model information, etc., to the network device 30 over the network 22 such that the network device 30 can process all such inputs to create a virtual map of the roads traveled by these various vehicles (i.e., road inputs vs. GPS locations). This information can be processed by the controller 36 and stored in a database 58 of the network device 30. Using the information stored in the database 58, the network device 30 can calculate ideal active suspension parameters for one or more vehicles in communication with the network device 30, such as vehicle 40 representing the at least controller vehicle of the system 10. Of course, many vehicles, like vehicle 40, can be included in the system 10 for receiving ideal active suspension parameters from the network device 30 over the network 22.

The vehicles of the system 10 need not be configured to only upload information to the network device 30 or only receive ideal suspension parameters from the device 30. Rather, each vehicle of the system 10 can both upload information to the network device 30 and receive ideal suspension parameters from the device 30, though this is not required. For example, in the illustrated embodiment, the vehicle 40 can include an adaptive active suspension 42 and its transmitter 18 can include or be embodied as a transceiver for receiving ideal suspension parameters calculated by the network device 30 and transmitted by the network device 30 over the network 22. The adaptive active suspension 42 can then be adjusted on the vehicle 40 based on the ideal suspension parameters received from the network device 30. Similarly, the vehicle 40 can include a vehicle position detector 14, a road condition detector 16, and optionally a vehicle speed detector 54, all linked to the controller 48. The receiver 44 can be supplemented with a transmitter or configured as a transceiver such that road condition information, vehicle position, and vehicle speed as determined by the detectors 14, 16, 54 can be transmitted to the network device 30 over the network 22 along with vehicle model information if desired. Accordingly, though not required, the vehicles 12, 40 of the system 10 can include hardware and components for transmitting information to the network 30 for calculating the ideal active suspension parameters and include adaptive active suspensions and appropriate components for receiving the ideal active suspension parameters from the network device 30 over the network 22 for adjusting the adaptive active suspension 42 (i.e., the vehicle can be an aware vehicle that collects road information and receives ideal suspension parameters based on all road information collected from vehicles of the system).

Figure 2:
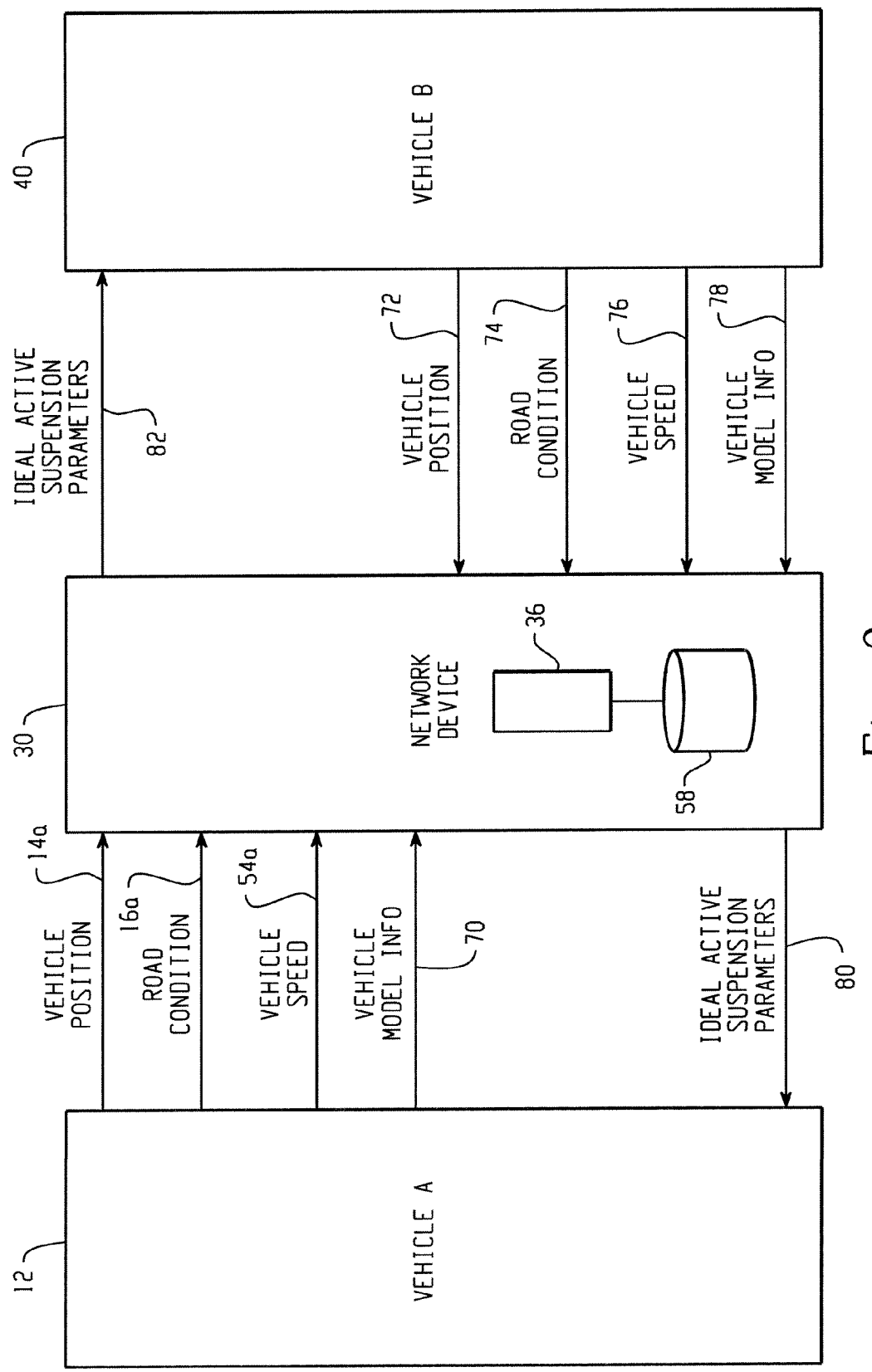
FIG. 2 is a schematic diagram illustrating how at least first and second vehicles communicate with a network device.

FIG. 2 illustrates communications between the network device 30 and vehicle 12 (which is representative of vehicles of the system 10 providing information to the network device), and also illustrates communications between the network device 30 and the vehicle 40 (which is representative of vehicles of the system receiving ideal suspension parameters). As shown, the vehicle 12 communicates a road position 14a to the network device, a road condition 16a, vehicle speed 54a, and/or vehicle model information 70 to the network device 30. Of course, any number of vehicles of the system 10 can likewise communicate such information to the network device 30 over the network 22. In addition, as illustrated, vehicles receiving ideal active suspension parameters can also communicate such information. For example, the vehicle 40 can communicate its vehicle position, road condition, vehicle speed and/or model information to the network device 30 as indicated at 72, 74, 76, and 78.

Using this communicated information, the network device 30 can calculate ideal suspension parameters for vehicles of the system 10. These ideal active suspension parameters can be communicated to the vehicles of the system 10 configured to receive such parameters and actively adjust their suspensions based on such received parameters. For example, illustrated vehicles 12, 40 can receive calculated ideal active suspension parameters as indicated at 80 and 82. In particular, the ideal active suspension parameters can be continuously calculated and communicated or streamed in real-time to the vehicles 12, 40 (and other vehicles of the system 10) and can be particular to a specific location at which the vehicle receiving such calculated parameters is traveling. In an alternate embodiment, the ideal active suspension parameters are not streamed in real-time, but instead are downloaded or transmitted from the network device 30 for an entire driving route entered into the vehicle navigational system. This can occur, for example, in advance (or near the beginning) of driving the route.

The ideal active suspension parameters can also be tailored to the speed of the vehicle and the vehicle model information of vehicle 40. For example, the ideal active suspension parameters 82 transmitted to the vehicle 40 by the network device 30 can be particular to a specific vehicle position, vehicle speed, and vehicle model information, and can be specifically tailored to a road condition expected to be encountered by the vehicle 40. Thus, if vehicle 12, and any number of other vehicles of the system 10, encounter a rough road at a specific vehicle position while traveling at a specific vehicle speed, this information can be used along with the vehicle model information to communicate ideal active suspension parameters to other vehicles, such as vehicle 40, that are likewise going to encounter the same road condition at the same vehicle position.

The ideal active suspension parameters can be modified, however, to account for varying vehicle speeds between the vehicles 12 and 40 as well as varying vehicle model information between the vehicles 12 and 40. For example, vehicle 12 could be a sports car that has a suspension tuned toward tighter handling, whereas vehicle 40 could be a luxury vehicle having a softer suspension tuned to absorb rough roads more easily. Taking this variation into account, the ideal active suspension parameters provided to the vehicle 40 from the network device 30 can be tailored such that the vehicle 40 has its adaptive active suspension adjusted appropriately.

Turning to FIG. 4, an aware vehicle network method is illustrated for one or more vehicles having adaptive active suspensions. More particularly, as indicated at S100 and S102, vehicle position and road condition information are received from at least a first vehicle, such as vehicle 12. As already indicated herein, the vehicle 12 can acquire this information through road condition detector 16 and vehicle position detector 14. The detected vehicle position and road condition information can then be transmitted as shown in FIG. 2 as 14*a* and 16*a* to the network device 30 over the network 22. In addition, if desired, vehicle speed 54*a* can be received by the network device 30 from the vehicle 12 (S104). Likewise, vehicle model information can be received by the network device 30 from the vehicle 12 over the network 22 (S106). Of course, this information (i.e., vehicle position 14*a*, road condition 16*a*, vehicle speed 54*a* and/or vehicle model information 70) can be received from vehicles in addition to vehicle 12. In particular, the system 10 is likely to have enhanced usefulness when a significant number of vehicles are used in the system transmitting information to the network device 30. This will allow road condition information for numerous vehicle positions to be accumulated by the network device 30 and stored in a database 58 (i.e., "mapped"). Moreover, such road condition information is even more useful when confirmed by multiple vehicles, traveling at multiple speeds, and having various suspension and tire dynamics (i.e., vehicle model information).

In any case, at S108, a network device 30 calculates ideal suspension parameters from at least the vehicle position ascertained in S100 and the road condition ascertained in S102. When supplied, the ideal suspension parameters can further be calculated from the vehicle speed ascertained in S104 and/or the vehicle model information ascertained in S106. Once the ideal suspension parameters are calculated in S108, these can be sent to at least a second vehicle, such as vehicle 40 in S110. When received by an aware vehicle, such as vehicle 40, the adaptive active suspension 42 on the vehicle 40 can be adjusted corresponding to the ideal suspension parameters received (S112). Of course, like the vehicles providing information to the network device 30 over the network 22, the vehicles, like vehicle 40, receiving ideal suspension parameters from the network device 30 over the network 22 can include any number of vehicles.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, transmitter 18 and antenna 20 may suitably be integrated together.

It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. For example, ECU 48 may be divided into one control unit for handling communications with detectors/sensors 14, 16 and 54 and network device 30, while a separate control unit (or units) may be provided for the adaptive active suspension 42. Similarly, the network device 30 may be formed from a plurality of network devices distributed throughout the system 10. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

An adaptive active suspension and aware vehicle network system and method has been described with reference to specific embodiments. In short, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. The invention is not limited to only those embodiments and examples described above. Instead, the invention is intended to cover all alternatives, modifications, variations, improvements or alterations that come within the scope of the appended claims and the equivalents thereof.

What is claimed is:

1. An aware vehicle network system for one or more vehicles having an adaptive active suspension, comprising:

at least one vehicle having a vehicle position detector for determining a vehicle position of said at least one vehicle and a road condition detector for determining road condition information for any given position determined by said vehicle position detector, said at least one vehicle also having a transmitter for sending said road condition information determined by said road condition detector and said vehicle position determined by said vehicle position detector over a vehicle communication network;

a network device having a transceiver for receiving said road condition information and said vehicle position from said transmitter of said at least one vehicle over said vehicle communication network, said network device calculating ideal active suspension parameters based on said road condition information and said vehicle position received from said at least one vehicle, said network device sending said ideal active suspension parameters over said vehicle communication network via said transceiver; and at least another vehicle having an adaptive active suspension and a receiver for receiving said ideal suspension parameters from said network device, said adaptive active suspension adjusted based on said ideal suspension parameters received from said network device.

2. The aware vehicle network system of claim 1 wherein said at least one vehicle further includes a vehicle speed detector for monitoring a vehicle speed of said at least one vehicle, said transmitter sending said vehicle speed determined by said vehicle speed detector over said vehicle communication network, said transceiver of said network device receiving said vehicle speed from said transmitter over said vehicle communication network, said network device calculating said ideal active suspension parameters based on said road condition information, said vehicle position, and said vehicle speed.

3. The aware vehicle network system of claim 1 wherein said at least one vehicle has an adaptive active suspension and a receiver for receiving said ideal suspension parameters from said network device, said adaptive active suspension of said at least one vehicle adjusted based on said ideal suspension parameters received from said network device.

4. The aware vehicle network system of claim 3 wherein said at least another vehicle has a vehicle position detector, a road condition detector and a transmitter for sending road condition information and vehicle position over said vehicle communication network.

5. The aware vehicle network system of claim 1 wherein said vehicle position detector is a global positioning satellite (GPS) system including a GPS device mounted onboard said at least one vehicle.

6. The aware vehicle network system of claim 1 wherein said road condition detector includes at least one G sensor.

7. The aware vehicle network system of claim 6 wherein said at least one G sensor includes a G sensor disposed on a suspension knuckle of said at least one vehicle.

8. The aware vehicle network system of claim 1 said transmitter sends vehicle model information corresponding to said at least one vehicle over said vehicle communication network, said transceiver of said network device receiving said vehicle model information from said transmitter over said vehicle communication network, said network device calculating said ideal active suspension parameters based on said road condition information, said vehicle position, and said vehicle model information.

9. The aware vehicle network system of claim 8 wherein said at least one vehicle further includes a vehicle speed detector for monitoring a vehicle speed of said at least one vehicle, said transmitter sending said vehicle speed determined by said vehicle speed detector over said vehicle communication network, said transceiver of said network device receiving said vehicle speed from said transmitter over said vehicle communication network, said network device calculating said ideal active suspension parameters based on said road condition information, said vehicle position, said vehicle model information and said vehicle speed.

10. The aware vehicle network system of claim 9 wherein said at least another vehicle includes a transmitter for sending vehicle model information corresponding to said at least another vehicle over said vehicle communication network, said network device calculating said ideal active suspension parameters based on said vehicle model information of said at least one vehicle and said vehicle model information of said at least another vehicle.

11. The aware vehicle network system of claim 8 wherein said vehicle model information includes vehicle assembly information and vehicle tire model information.

12. The aware vehicle network system of claim 1 wherein adjustment of said adaptive active suspension based on said ideal suspension parameters includes adjustment of said adaptive active suspension immediately in advance of particular road conditions.

13. An aware vehicle network method for one or more vehicles having an adaptive active suspension, comprising
receiving vehicle position and road condition information from at least a first vehicle;
calculating ideal suspension parameters from said vehicle position and said road condition information;
sending said ideal suspension parameters to at least a second vehicle; and
adjusting an adaptive active suspension on said at least a second vehicle corresponding to said ideal suspension parameters.

14. The aware vehicle network method of claim 13 further comprising:
receiving vehicle speed from said at least a first vehicle, wherein said ideal suspension parameters are calculated from said vehicle position, said road condition information, and said vehicle speed.

15. The aware vehicle network method of claim 13 further comprising:
receiving vehicle model information from said at least a first vehicle, wherein said ideal suspension parameters are calculated from said vehicle position, said road condition information, and said vehicle model information.

16. An aware vehicle having an adaptive active suspension, comprising:
a vehicle body having a receiver mounted thereon for continuously receiving ideal active suspension parameters from a network device over a communication network; and
a controller onboard said vehicle body and linked to said receiver for receiving said ideal suspension parameters from said receiver and processing said ideal suspension parameters, said controller adjusting the adaptive active suspension based on said ideal suspension parameters, wherein said ideal suspension parameters are calculated by said network device based on road condition information and vehicle position information transmitted to said network device from a plurality of aware vehicles.

17. The aware vehicle of claim 16 further including:
a vehicle position detector mounted on said vehicle body for determining a vehicle position of said aware vehicle;
a road condition detector mounted on said vehicle body for determining road condition information for an given position determined by said vehicle position detector;
a transmitter mounted on said vehicle body for sending said road condition information determined by said road condition detector and said vehicle position determined by said vehicle position detector to said network device over said communication network.

18. The aware vehicle of claim 17 further including:
a speed detector mounted on said vehicle body for monitoring a vehicle speed of said aware vehicle, said transmitter sending said road condition information determined by said road condition detector, said vehicle position determined by said vehicle position detector and said vehicle speed determined by said speed detector to said network device over said communication network.

19. The aware vehicle of claim 17 wherein said vehicle position detector is a global positioning satellite (GPS) system including a GPS device mounted onboard said vehicle body.

20. The aware vehicle system of claim 17 wherein said road condition detector is a G sensor mounted on a suspension knuckle of said vehicle body.

21. The aware vehicle of claim 17 wherein said transmitter sends vehicle model information including at least one of vehicle assembly information on said vehicle body or vehicle tire information corresponding to tires mounted on said vehicle body.

* * * * *